United States Patent

Hall

[11] Patent Number: 5,808,622
[45] Date of Patent: Sep. 15, 1998

[54] IMAGE DISPLAY USING IRREGULARLY PLACED CURVING STRUCTURES

[76] Inventor: Daniel Hall, 1 Hollymount, St Matthews St, Cambridge, England

[21] Appl. No.: 692,487

[22] Filed: Aug. 6, 1996

Related U.S. Application Data

[62] Division of Ser. No. 283,028, Jul. 29, 1994, Pat. No. 5,579,457.

[51] Int. Cl.⁶ ................................... H04N 1/21
[52] U.S. Cl. .......................... 345/432; 345/431
[58] Field of Search ..................... 395/131, 132

[56] References Cited

U.S. PATENT DOCUMENTS

| | | | |
|---|---|---|---|
| 4,736,254 | 4/1988 | Kotera et al. | 358/457 |
| 4,837,613 | 6/1989 | Paxton et al. | 358/75 |
| 4,958,272 | 9/1990 | Wake | 364/518 |
| 5,016,191 | 5/1991 | Radochonski | 364/518 |
| 5,111,310 | 5/1992 | Parker et al. | 358/456 |
| 5,225,915 | 7/1993 | Ciccone et al. | 358/454 |
| 5,235,435 | 8/1993 | Schiller | 358/456 |
| 5,267,054 | 11/1993 | Chang et al. | 358/456 |
| 5,287,195 | 2/1994 | Blumer | 358/298 |
| 5,305,118 | 4/1994 | Schiller et al. | 358/456 |
| 5,307,181 | 4/1994 | Levien | 358/456 |
| 5,315,669 | 5/1994 | Kumagai | 382/50 |
| 5,526,438 | 6/1996 | Barton | 382/237 |
| 5,579,457 | 11/1996 | Hall | 395/132 |

FOREIGN PATENT DOCUMENTS

| | | |
|---|---|---|
| 0199469 | 10/1986 | European Pat. Off. . |
| 0293214 | 11/1988 | European Pat. Off. . |
| 0369302 | 5/1990 | European Pat. Off. . |
| 0560285 | 3/1992 | European Pat. Off. . |
| 0501126 | 9/1992 | European Pat. Off. . |
| 0606992 | 7/1994 | European Pat. Off. . |
| 0647058 | 4/1995 | European Pat. Off. . |

OTHER PUBLICATIONS

Ulichney, Robert, *Digital Halftoning*, Cambridge, MA; MIT Press, 1987), (ISBN #0–262–21009–6).

Foley, et al., *Computer Graphics: Principles and Practice*, Addison–Wesley Publsihing Co., 1990.

*Primary Examiner*—Phu K. Nguyen
*Assistant Examiner*—Cliff N. Vo
*Attorney, Agent, or Firm*—Fliesler Dubb Meyer & Lovejoy

[57] ABSTRACT

A method and apparatus for digital halftoning places curving structure centers at random locations within a halftone cell. Pixel illumination ordering is determined based on displacement from a pixel to a nearest CSC along a curving structure. Curving structures including spirals with varying numbers of arms, varying angles of departure, varying orientations, and varying other parameters are used to achieve visual aesthetics as desired.

12 Claims, 7 Drawing Sheets

| 0.59 | 0.04 | 0.10 | 0.74 | 0.88 | -0.46 | -0.80 | 0.77 | 0.74 | -0.30 | -0.87 | -0.96 | -0.85 | -0.25 | 0.02 | 0.99 |
| --- | --- | --- | --- | --- | --- | --- | --- | --- | --- | --- | --- | --- | --- | --- | --- |
| 0.52 | 0.84 | 0.82 | 0.39 | -0.56 | -0.95 | 0.38 | 0.81 | -0.65 | -0.85 | -0.06 | 0.26 | -0.11 | -0.88 | -0.67 | -0.32 |
| 0.23 | -0.83 | -0.98 | -0.91 | -0.99 | -0.74 | 0.93 | -0.05 | -0.93 | 0.54 | 0.94 | 0.67 | 0.96 | 0.55 | -0.86 | -0.31 |
| -0.95 | -0.38 | 0.61 | 0.83 | 0.50 | -0.51 | -0.92 | -0.55 | -0.45 | 1.00 | -0.48 | -0.99 | -0.44 | 0.95 | -0.02 | 0.47 |
| -0.71 | 0.88 | 0.52 | 0.01 | 0.66 | 0.84 | -0.66 | -0.52 | -0.49 | 1.00 | -0.36 | 0.59 | -1.00 | 0.51 | 0.48 | -0.36 |
| -0.29 | 0.96 | -0.83 | -0.78 | -0.77 | 0.85 | 0.13 | 0.08 | -0.98 | 0.23 | 0.87 | 0.16 | -0.99 | 0.59 | 0.42 | -0.66 |
| -0.60 | 0.96 | 0.47 | 0.67 | -1.00 | 0.54 | 0.44 | 0.93 | -0.36 | -1.00 | -0.90 | -1.00 | -0.24 | 0.99 | -0.90 | -0.46 |
| -0.99 | -0.31 | 0.30 | -0.44 | -0.85 | 0.80 | 0.19 | 0.50 | 0.97 | 0.43 | 0.11 | 0.43 | -0.79 | -0.08 | 0.08 | -0.42 |
| 0.14 | -0.79 | -0.96 | -0.74 | 0.33 | 0.94 | -0.55 | -0.61 | -0.05 | 0.62 | -0.39 | -0.77 | 0.71 | 0.93 | 0.81 | 0.99 |
| 0.99 | 0.89 | 0.74 | 0.92 | 0.89 | -0.18 | -0.99 | 0.31 | -0.03 | 0.88 | -0.85 | -0.04 | 0.90 | -0.68 | -0.93 | -0.01 |
| 0.85 | -0.48 | 0.09 | -0.01 | -0.68 | -0.94 | 0.26 | 0.94 | -0.03 | 0.88 | -0.85 | -0.03 | 0.88 | -0.83 | 0.04 | -0.88 |
| -0.19 | 0.97 | 0.81 | 0.89 | 0.86 | -0.42 | -0.83 | 0.76 | -0.40 | 1.00 | -0.39 | -0.78 | 0.60 | 0.93 | -0.11 | -0.85 |
| 0.68 | 0.34 | -0.94 | -0.78 | 0.57 | 0.65 | -0.95 | 0.10 | -0.92 | 0.63 | 0.66 | -0.71 | -0.96 | -0.83 | -0.99 | 0.00 |
| 0.69 | 0.30 | 1.00 | -0.68 | -0.28 | 0.97 | -0.69 | -0.28 | -0.80 | -0.52 | 0.81 | 0.82 | 0.16 | -0.04 | 0.44 | -0.97 |
| -0.27 | 0.85 | 0.76 | -0.76 | -0.23 | 0.96 | -0.71 | -0.26 | 0.97 | -0.90 | -0.66 | 0.29 | 0.80 | 0.88 | 0.73 | -0.89 |
| -0.95 | -0.88 | -0.92 | -0.80 | 0.62 | 0.60 | -0.96 | 0.16 | 0.55 | 1.00 | 0.84 | 0.73 | 0.86 | -0.86 | 0.97 | 0.14 |

FIG. 4

| | | | | | | | | | | | | | | |
|---|---|---|---|---|---|---|---|---|---|---|---|---|---|---|
|176|131|136|195|221|86|51|200|197|103|36|14|44|109|130|248|
|170|211|207|157|77|19|156|205|74|40|117|148|115|35|70|100|
|146|47|10|28|4|61|232|119|24|171|236|189|241|174|38|101|
|17|96|181|209|167|82|27|79|88|251|84|5|89|237|125|164|
|65|224|169|129|186|212|73|81|83|254|98|177|0|168|165|97|
|104|239|45|55|58|213|139|134|11|147|218|144|7|178|158|71|
|76|238|163|188|1|172|162|230|99|2|30|3|110|249|31|87|
|8|102|152|90|42|202|145|166|244|159|138|160|53|116|133|92|
|141|54|15|62|154|235|78|75|118|182|94|59|192|231|204|250|
|247|227|196|229|226|113|9|153|122|222|43|120|228|68|23|127|
|215|85|135|126|69|21|149|234|124|220|41|123|223|49|132|34|
|112|245|203|225|216|91|46|199|93|255|95|56|180|233|114|39|
|190|155|22|57|175|185|18|137|26|184|187|64|16|48|6|128|
|191|151|253|67|105|243|66|106|52|80|206|208|143|121|161|12|
|107|214|198|60|111|240|63|108|242|29|72|150|201|219|194|32|
|20|33|25|50|183|179|13|142|173|252|210|193|217|37|246|140|

IMAGE DISPLAY USING IRREGULARLY PLACED CURVING STRUCTURES

This is a division of application Ser. No. 08/283,028, filed on Jul. 29, 1994, now U.S. Pat. No. 5,579,457.

37 C.F.R. 1.71 AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office records, but otherwise reserves all copyright rights whatsoever.

BACKGROUND AND FIELD OF THE INVENTION

This invention relates generally to the field of image display and reproduction, and specifically to the display and reproduction of digitally-stored monochrome and color images using irregularly placed curving structures, where such display and reproduction is accomplished using a monitor, a printer, a plotter, or a typesetter. The digital images may consist of elements that have been scanned, manually digitized graphics, or computer generated graphics or text.

Color and monochrome reproduction devices such as monitors, printers, and typesetters display, print, or typeset images using a grid of pixels. In such systems each pixel in the grid of pixels is set to a pixel intensity value within a range of possible intensity values. The permitted range of possible values is determined by the printing or display process adopted.

In many systems the range of pixel intensity values present in the digital image to be reproduced is greater than the range of pixel intensity values permitted by the display, printing or typesetting process. For example, the digital image might contain color values represented by 8 bits (256 possible levels of intensity) per pixel per color channel, while the printing device may be capable at any given point on the paper of printing ink, or leaving the paper without ink, resulting in 1-bit (two possible levels of intensity) per pixel per color channel. In these cases images must be reproduced by setting the intensity values of pixels such that, over a suitably chosen area, the average of the pixel intensity values of the displayed, printed, or typeset image is approximately equal to the average image pixel intensity over the same area of the digital image. This process is known as "halftoning."

Many methods exist for converting from many bits per pixel to few bits per pixel. One such method is known as "threshold array" halftoning. Using this method a threshold array is defined that contains data representing a halftone screen element, or a spot function, that is repeated periodically across the image to be reproduced. The spot function contains data with the same range as that of the digital image data to be halftoned and at the same resolution as the output device. As the value of each output pixel is calculated the corresponding pixel in the threshold array is selected, along with the corresponding digital image input pixel. For each output pixel the value of the then current input pixel and the threshold array pixel are compared. If the input data pixel value is higher than the threshold array pixel the corresponding output pixel is set to its "on" state. If the input data value is less than or equal to the threshold array pixel the corresponding output pixel is set to its "off" state. The values of the pixels in the threshold array, or the "spot function" determines the shape of the resulting half tone dot for any given shade of tone or color of the input data.

The values of the pixels in the threshold array also indicate the order in which the corresponding device pixels are to be illuminated as the gray, or color, intensity is increased from zero to full intensity. This is referred to as the order of illumination of pixels. If this processing is employed in an environment were an output pixel may have more than two levels, known methods may be used to apply the halftone cell description to a multilevel output device.

Most halftone screening systems using threshold arrays use spot functions that create highly clustered halftone dots having compact and regular shapes such as squares, ellipses, or circles on grids of fixed spatial frequency, or line screen ruling that typically ranges from about 65 lines per inch to about 200 lines per inch. This regular and fixed pattern of dots causes interference, or moiré, patterns under a wide variety of conditions. The fixed and regular screen ruling and highly clustered dot structure also limits the visual sharpness of pictures reproduced using this method.

Threshold array spot functions can also be created that are not clustered. A non clustered but regular halftone dot shape is produced by Bayer dither that can easily be expressed in terms of a spot function or a threshold array. Bayer dither produces results that have very fine structures, and thus cannot be printed using some systems. Bayer dither also maintains a very regular pattern that causes severe interference, or moiré, patterns under some conditions.

It is also possible to produce non clustered structures that do not form a regular, periodic, pattern by defining the spot function as successive samples of a random and uncorrelated variable. Though "random" screening is free from moiré effects due to the fact that no regular pattern exists, and produces images with greater apparent sharpness than does conventional clustered dot screening, random screening suffers from two major drawbacks. Because it is random and uncorrelated, clusters of random size and position form. These clusters may make images look "noisy" or "grainy." Because many of the structures using random screening are uncontrollably small and since, at any given shade of tone or color, structures of many different sizes are present due to the random clustering of output pixels, the resulting random halftone patterns are difficult to print and some printing processes that use them are inherently unstable.

It is possible to shape the "spectrum" of a random screen structure. This still results in random patterns, but introduces some correlation which reduces the appearance of graininess to some degree.

Some other known techniques for digital halftoning operate by selecting a suitable halftone pixel value, estimating the error between this value and the digital image input pixel intensity value, and compensating for this error when selecting the halftone pixel value for neighboring pixels. These techniques are known collectively as error diffusion halftoning. Error diffusion halftoning has the disadvantage of producing distracting artifacts in the form of long and narrow connected structures, and is computationally intensive, thus causing very long data processing times.

The halftones produced using any of the known "non-clustered" techniques cannot be accurately imaged using some standard printing techniques as in some cases individual pixels are produced that are smaller than the minimum size that can be reproduced. Techniques aimed at improving printability by simple pixel replication may result in a reduction of the apparent resolution of the image, or an increase in the visual noise or graininess.

Color images may be reproduced using multiple halftone screens. For example, when using cyan, magenta, yellow and black printing inks, images are processed to produce color separations, or color channels, and each color separation is reproduced using a method similar to that for monochrome images. These, when overlaid, form complex patterns of color mixtures on a very small scale. When viewed at normal viewing distances the limited resolving power of the observer's eye merges these patterns together to cause the sensation of nearly homogeneous areas of color. The periodic patterns used with conventional clustered dot screening disturb the homogeneous sensation adding to the "roughness" of color tone. Many of the "random" screening methods produce images that appear "grainy" or "noisy," and so do not have a homogeneous, or smooth appearance.

It would be desirable to be able to produce halftone patterns that have combinations of both random and ordered structures that have properties of increased perception of smoothness, homogeneity of color, freedom from interference or moiré patterns, and that have controllable cluster sizes to establish stable and controllable printing conditions.

SUMMARY OF THE INVENTION

In order to avoid the disadvantages of conventional random halftoning schemes the method and apparatus of the present invention determines a halftone threshold array, or halftone cell, containing irregularly placed curving structures (or "IPCSs").

In accordance with the present invention, IPCSs are represented by a two dimensional array of numbers referred to as an IPCS array and having the same domain as the halftone cell. The values in the IPCS array are set by sub-dividing the IPCS array into evenly spaced 2-D regions within which a point is selected (for instance at random) to be the curving structure center. Each curving structure center (CSC) is replicated to form new CSCs at locations in neighboring cells with corresponding positions in order to ensure the even tessellation of the IPCS halftone cell. The value of each element in the IPCS array is then determined by applying a function dependent on the position of the IPCS array element relative to its closest curving structure center. The intensity map of the elements of the IPCS array in the neighborhood of a curving structure center thus forms a curving structure, for example, a spiral.

The elements in the IPCS array can then be used to generate a halftone cell description suitable for use by image rendering software and/or hardware.

The resulting halftone cell has improved visual and printing characteristics, as the irregularly placed curving structures have many of the benefits of a purely random screen without the uncontrolled noise inherent in such a system. In particular, the use of curving structures reduces the chance alignment of pixels into linear visual artifacts. A visual characteristic of the present invention is that the irregularly placed curving structures can be seen in the pattern of pixels representing those gray levels of approximately 50% intensity.

BRIEF DESCRIPTION OF THE DRAWINGS

FIGS. 1(a)–(b) illustrate a conventional random halftone cell. Specifically, In FIG. 1(b) those pixels that correspond to an order of illumination value less than 128 are illustrated.

FIGS. 3(a)–(b) illustrate the division of a 16×16 IPCS array into four regions. Specifically.

FIG. 4 illustrates the values given to the elements of the 16×16 IPCS array shown in FIG. 3(a) by the processing described in FIG. 2.

FIGS. 5(a)–(c) illustrate an IPCS halftone cell. Specifically.

DETAILED DESCRIPTION OF THE DRAWINGS

Figure 1A:
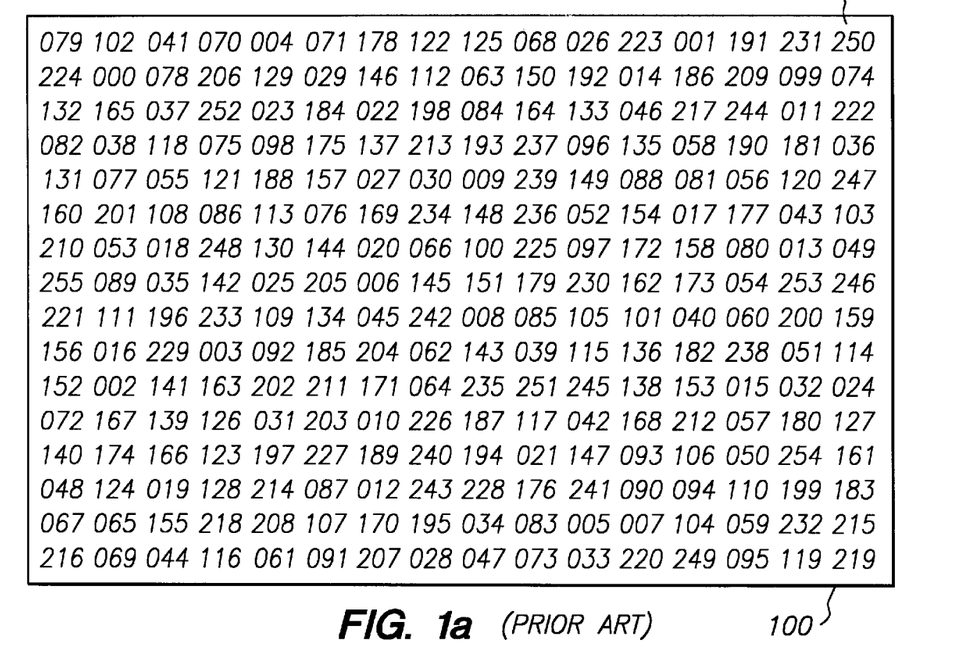
FIG. 1(a) illustrates the order of illumination of a 16×16 halftone cell.
Figure 1B:
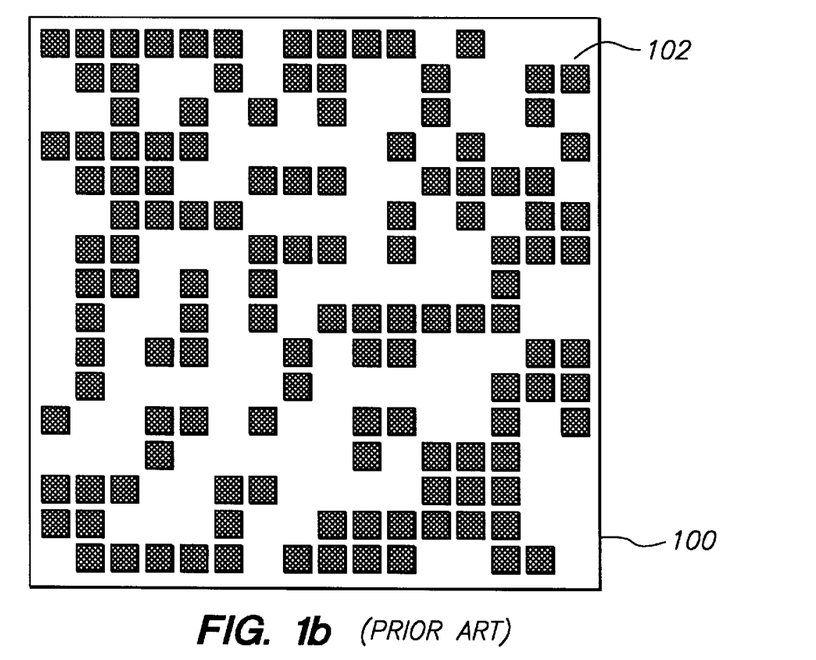
FIG. 1(b) illustrates pixel illumination for an image of 50% intensity using a halftone cell as shown in FIG. 1(a).

Referring now to FIG. 1(a), there is shown a conventional 16×16 random halftone cell 100 comprised of 256 pixels, e.g., 101. In accordance with the halftone cell 100, the order of illumination of pixels is chosen using a random number generator without replacement and is given by a number between 0 and 255 inclusive assigned to each pixel shown in FIG. 1(a). For example, the pixel assigned number 0 illuminated first and the pixel assigned number 255 is illuminated last. FIG. 1(b) is another representation of halftone cell 100 showing the illumination of pixels, e.g., 102, resulting from a 50% intensity image displayed in accordance with the order of illumination of FIG. 1(a). As is evident from FIG. 1(b), certain portions of cell 100 have few illuminated pixels, resulting in "blotches" in the image. If random illumination results in sufficiently large blotches, such blotches may become easily visible and distracting artifacts to the overall image.

Figure 2:
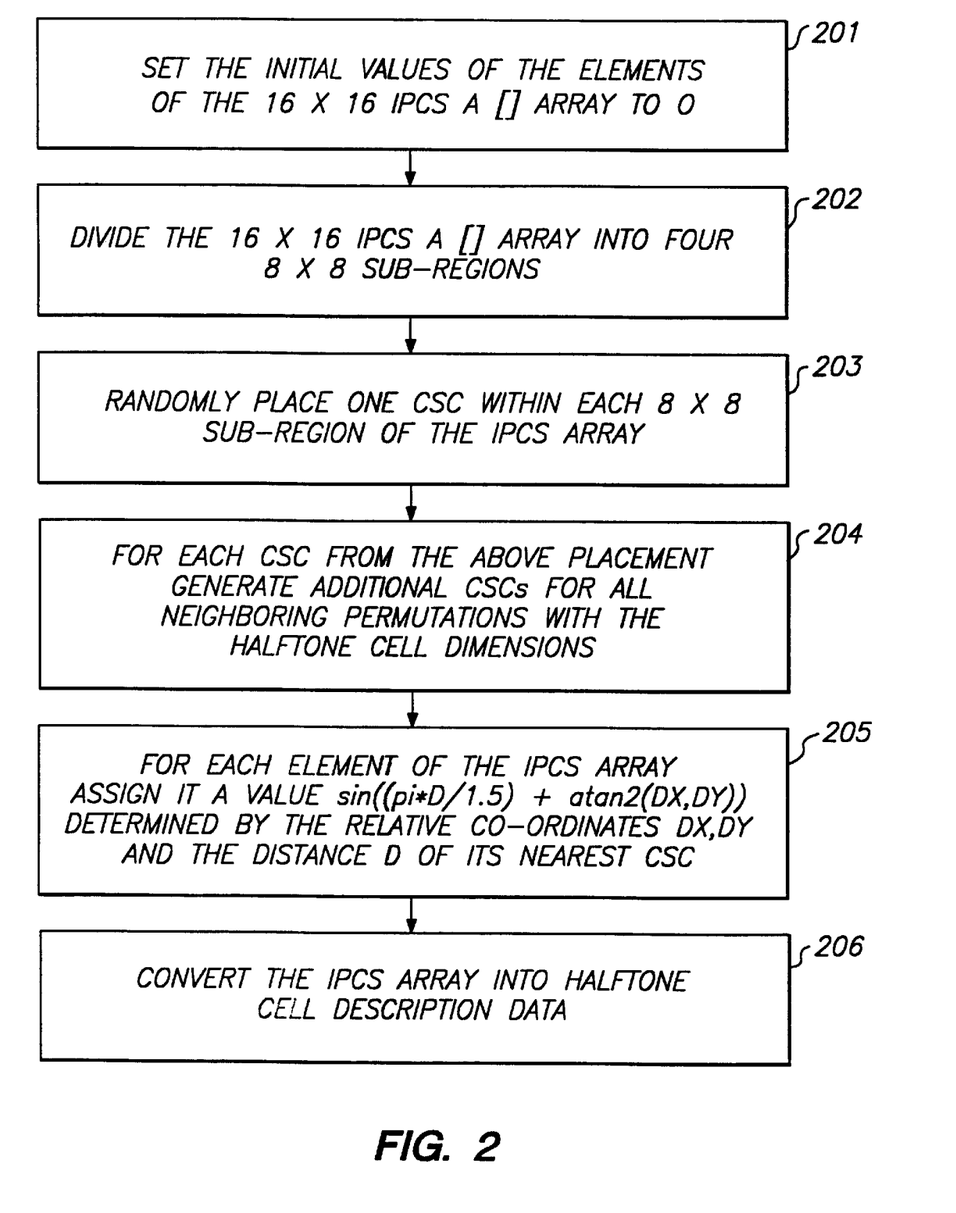
FIG. 2 illustrates a flow chart of processing to determine a halftone cell in accordance with the present invention.

Referring now to FIG. 2 there is shown a flow chart of processing to specify a 16×16 IPCS halftone cell in accordance with the present invention.

Figure 3A:
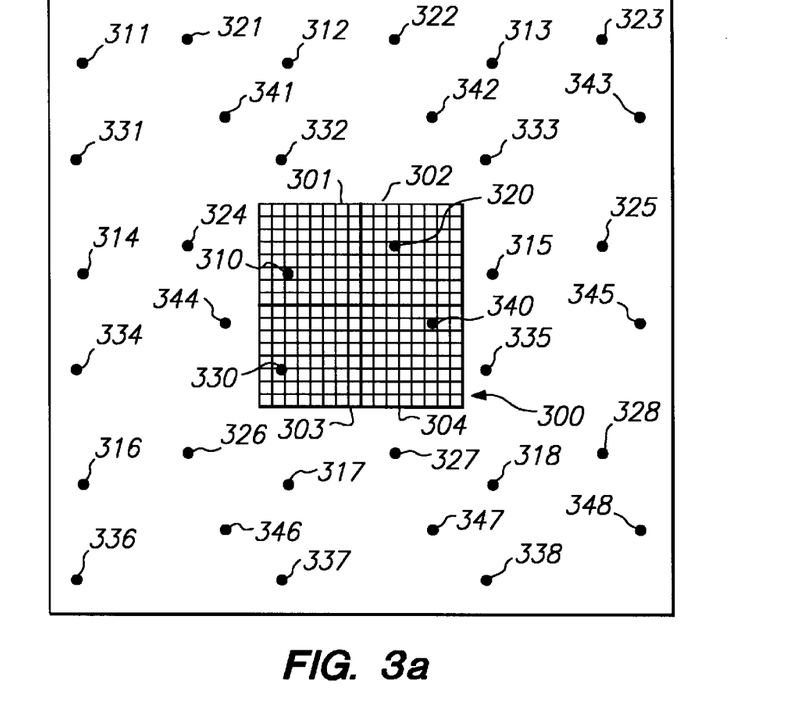
FIG. 3(a) illustrates one possible placement of curving structure centers used for the halftone cell in accordance with the present invention.

Processing begins by setting 201 an initial value of 0 for each of the elements of a 16×16 IPCS array A[]. The array A[] corresponds to 256 pixels of a displayed imaged, and an example of such as array is shown in FIG. 3(a), discussed in further detail below.

The region corresponding to the halftone cell represented by array A[] is divided 202 into four sub-regions, each of which is 8×8 pixels in size. A curving structure center, or CSC, is placed 203 at random within each of these sub-regions. This random placement 203 of CSCs is represented in pseudocode as:

```
FOR j := 0 TO 1 DO
BEGIN
    FOR i := 0 TO 1 DO
    BEGIN
        OX[i,j] := (i * 8) + (8 * RAND() );
        OY[i,j] := (j * 8) + (8 * RAND() );
    END;
END;
``` where OX[] and OY[] are 4 element arrays for storing X and Y coordinates defining the locations of these CSCs, and RAND0 is a function that generates a different random number having a value between 0 and 1 each time it is used. It should be noted that locations of CSCs need not be centered on halftone cell elements.

It should further be recognized that division 202 need not be into square regions, but regions of other shapes, for instance hexagonal, may be used as well in accordance with the present invention.

Additional CSCs are placed 204 at locations in the cells adjoining the original cell corresponding to the CSCs stored in OX[], OY[]. This is represented in pseudocode as:

```
n := 0;
FOR k := 0 TO 1 DO
BEGIN
    FOR j := 0 TO 1 DO
    BEGIN
        FOR i := 0 TO 1 DO
        BEGIN
            CX[n] := OX[i,j] - cell_width
                + (cell_width * (k MOD 3));
            CY[n] := OY[i,j] - cell_height
                + (cell_height * TRUNC(k/3));
            n := n + 1;
        END;
    END;
END;
``` where CX[] and CY[] are 36 element arrays for storing the locations of CSCs.

Each pixel represented as an element of array A[] is assigned 205 a value by a curving structure function, for example:

$$\sin((pi*D/1.5)+stan2(DX,DY))$$

where D is the distance from the pixel to the nearest CSC, and DX, DY the relative coordinates of the nearest CSC, and stan2 is a function whose range is (-pi, pl) that returns the angle whose tangent is DX/DY. This is represented in pseudocode as:

```
FOR j := 0 TO (cell_height - 1) DO
BEGIN
    FOR i := 0 TO (cell_width - 1) DO
    BEGIN
        D := 1000;
        FOR n := 0 TO 35 DO
        BEGIN
            TD := (SQRT(((i - CX[n]) * (i - CX[n]))
                + ((j - CY[n]) * (j - CY[n])));
            IF (TD < D) THEN
            BEGIN
                D := TD;
                DX := i - CX[n];
                DY := j - CY[n];
            END;
        END;
        A[i,j] := sin((pi * D/1.5) + atan2(DX,DY));
    END;
END;
```

The value thus obtained serves as a measure of precedence of the corresponding pixel with respect to other pixels in proximity to the same CSC. In other words, if pixels A and B both are closer to CSC Z than to any other CSC, and if the value obtained for pixel A using the above procedure is less than that obtained for pixel B, pixel A will have precedence over pixel B, and will be illuminated first as the intensity for that portion of the image increases. Note that not all of the CSCs for a 16×16 array are found within the domain of that array; this does not suggest, however, that the CSCs determined for a 16×16 array are used in connection with pixel illumination outside the 16×16 array. One possible example of values obtained using the processing illustrated in FIG. 2 is shown in FIG. 4, as will be discussed in greater detail below.

The processing described above uses a single arm spiral curving structure, but it should be recognized that other curving structures could be used as well. For example, a three arm spiral could be used. Furthermore, in a color situation, different spirals could be used for each color component (e.g., cyan, magenta, yellow and black). Aspects of the spirals such as the direction of turn, the angle of departure, the tightness of the spiral, and other factors may be varied as desired in order to obtain aesthetically pleasing results in the output image. In particular the above curving structure function shown in 205:

$$\sin((pi*D/1.5)+stan2(DX,DY))$$

could be expressed in more general terms as:

$$\sin(K1+(K2*D)+K3*stan2(DX,DY))$$

wherein the constant K1 determines the start angle of the spiral (the angle of the spiral at its center), the constant K2 determines the rate of turn of the spiral, the sign of K3 determines the direction (clockwise or counterclockwise) in which the spiral turns and the absolute cardinal size of K3 determines the number of arms of the spiral.

It should be recognized that there are known programming optimizations that can be applied to increase the speed of the above processing. For instance, if a large call is to be generated, only those CSCs within a distance of two sub-region divisions of the domain of the halftone cell need be considered as candidates for being the closest CSC to pixels in the halftone cell.

Figure 5A:
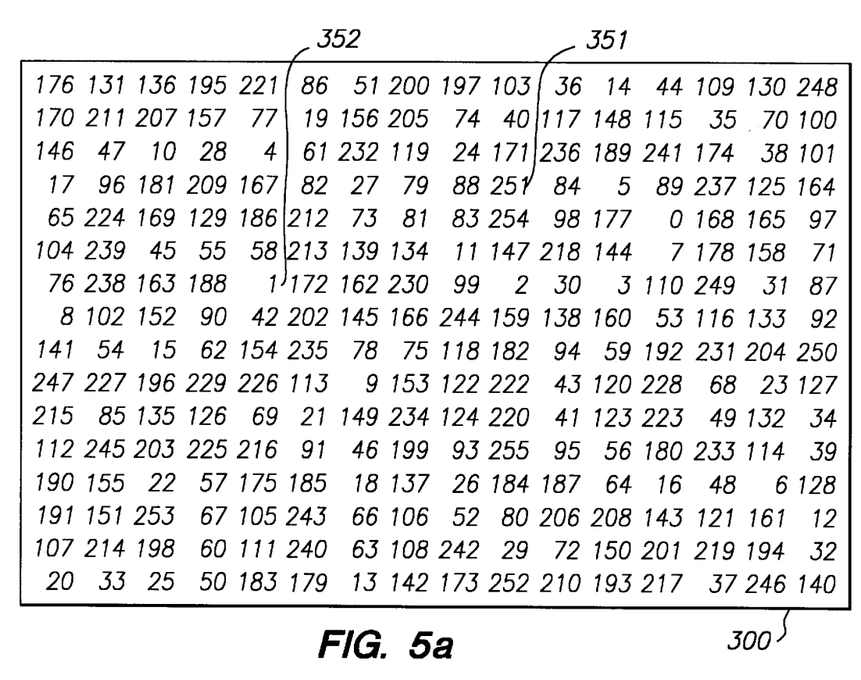
FIG. 5(a) illustrates the order of illumination of a 16×16 IPCS halftone cell.

The IPCS array thus obtained as illustrated in FIG. 4 is converted 206 into halftone cell description data, for example by sorting the values in the array in ascending order to obtain a pixel illumination order for the halftone cell as shown in FIG. 5(a) and discussed in greater detail below. It should be recognized that if the output pixel has more than two levels, known methods may be used to apply the halftone cell description to a multilevel output device.

Referring now to FIG. 3(a) there is shown a 16 pixel by 16 pixel IPCS array 300 and four 8×8 regions 301–304 within array 300. One CSC, e.g., 310, is placed at random within each region, e.g., 301. One possible arrangement of CSC placements in the domain of the 16×16 IPCS array 300 is shown in FIG. 3(a), with the CSCs labeled 310, 320, 330, 340. The location of each CSC in the domain of the 16×16 array is then used to determine the locations of eight additional CSCs corresponding to the displacement of the CSC by 16 pixels vertically, horizontally, or both vertically and horizontally, as described in connection with placing 204 CSCs in FIG. 2. For example, CSCs resulting from CSC 310 are labeled 311–318. Those CSCs resulting from CSC 320 are labeled 321–328 and so forth. While a 16×16 IPCS array has been illustrated for purposes of clarity in explanation, it should be noted that other sizes may be used as desired. In a preferred embodiment, a 240×240 array is employed, which is sub-divided into four hundred 12×12 regions, generating a 240×240 halftone cell.

Figure 3B:
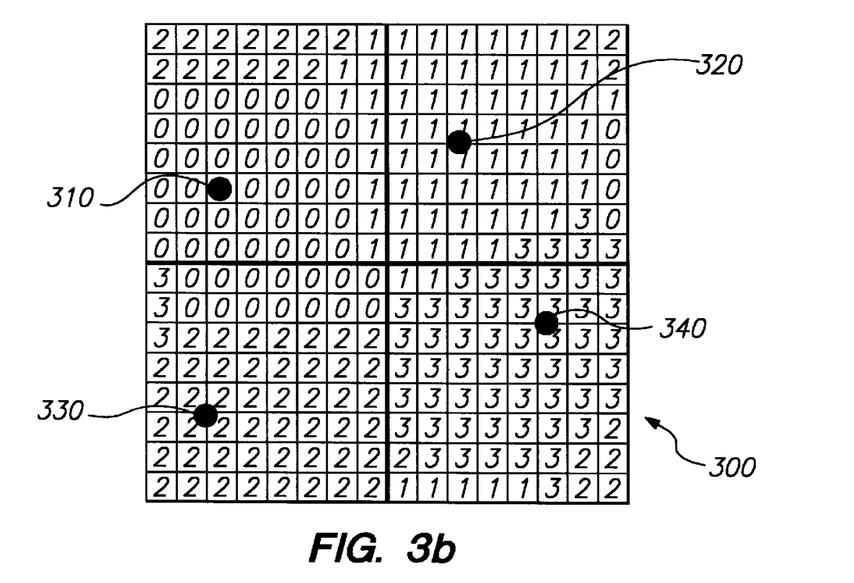
FIG. 3(b) illustrates pixel assignment to curving structure centers.

Referring now also to FIG. 3(b) there is shown an assignment of pixels to CSCs as described in the processing of FIG. 2 in the array 300 shown in FIG. 3(a). The pixels labeled 0 are associated with the CSC 310, either directly or via one of the replicated CSCs, e.g., 315, due to 310, similarly, the pixels labeled 1 are associated with the CSC 320, the pixels labeled 2 are associated with the CSC 330, the pixels labeled 3 are associated with the CSC 340. The associations shown in FIG. 3(b) have the effect of covering the area of the halftone cell with irregularly shaped tiles of roughly similar area that tessellate across the halftone cell boundaries.

Referring now to FIG. 4 there is shown the 16×16 IPCS array 300 as shown in FIG. 3(a) represented by values determined in accordance with the processing of FIG. 2. Specifically, FIG. 4 illustrates a value, e.g., 0.59, for each pixel, e.g., 350, of array 300. In the example of FIG. 4, smaller numbers represent a precedence of pixel illumination. Thus, pixel 352, having a value of −1.00, will be one of the first pixels to become illuminated within the display portion represented by array 300, while pixel 351, having a value of 1.00, will be one of the last pixels to be illuminated.

Figure 5B:
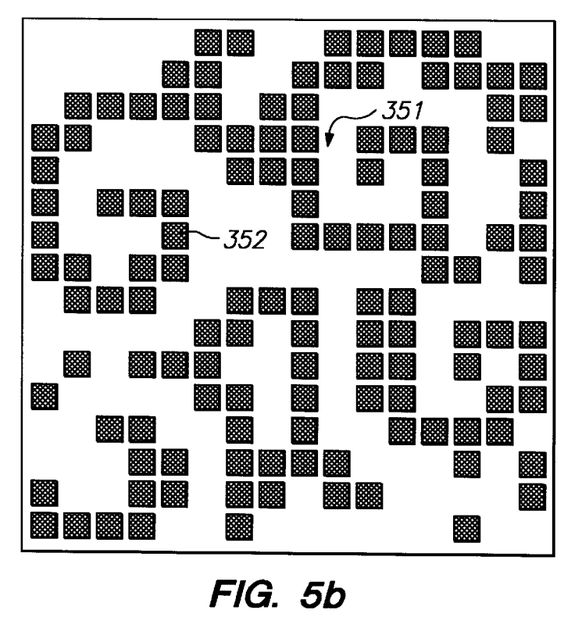
FIG. 5(b) illustrates pixel illumination for an image of 50% intensity using a halftone cell as shown in FIG. 5(a).

Referring now to FIG. 5(a) there is shown a representation of array 300 based on order of pixel illumination. The illustrated order of illumination is determined by sorting the element values shown in FIG. 4 in size order. As FIG. 5(a) illustrates, pixel 352 is indeed one of the first to be illuminated, while pixel 351 is indeed one of the last to be illuminated. A display having a pixel map that results when a 50% intensity image is displayed using the halftone cell in FIG. 5(a) is illustrated as FIG. 5(b), and shows pixel 352 to be illuminated (shown by cross-hatching), while pixel 351 is not illuminated (shown by lack of cross-hatching).

Figure 5C:
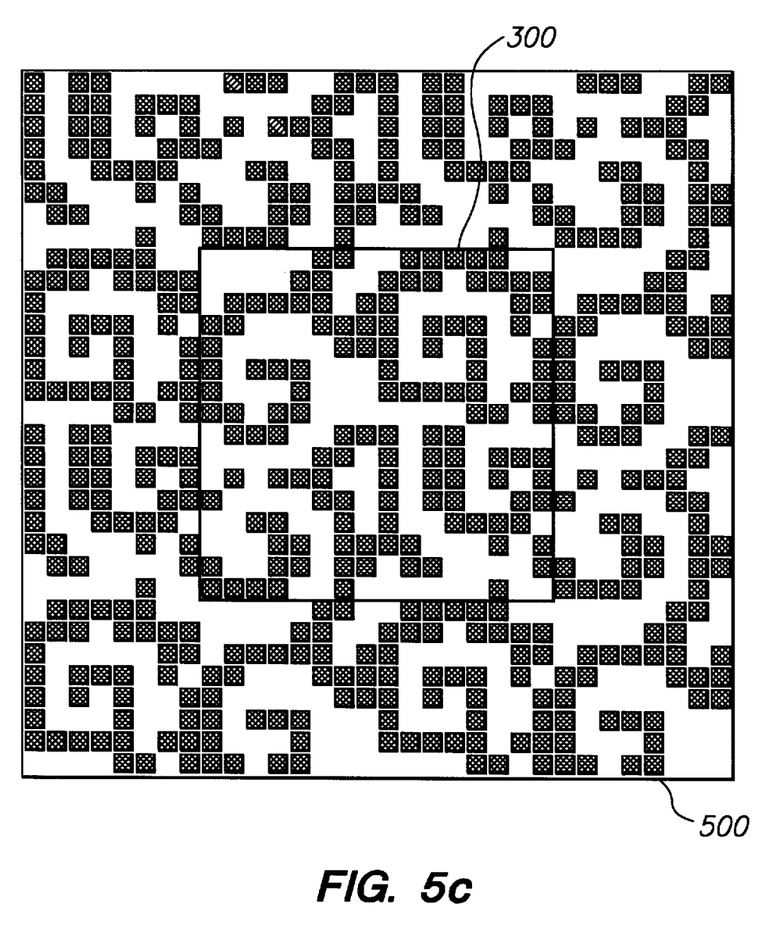
FIG. 5(c) illustrates pixel illumination for an image of 50% intensity using a halftone cell as shown in FIG. 5(a) as part of a larger portion of a display than shown in FIG. 5(b).

Referring now to FIG. 5(c) there is shown array 300 as a part of a larger portion 500 of a display. It has been found that, in practice, curving structures such as those visible in FIG. 5(c) do not lead to the distracting blotches that have characterized prior screening techniques.

It should be recognized that additional processing, for example to additionally smooth the appearance of the halftone cell, may be accomplished by processing the IPCS data either in its pre-ordered form, e.g., FIG. 4, or its ordered form, e.g., FIG. 5(a).

Figure 6:
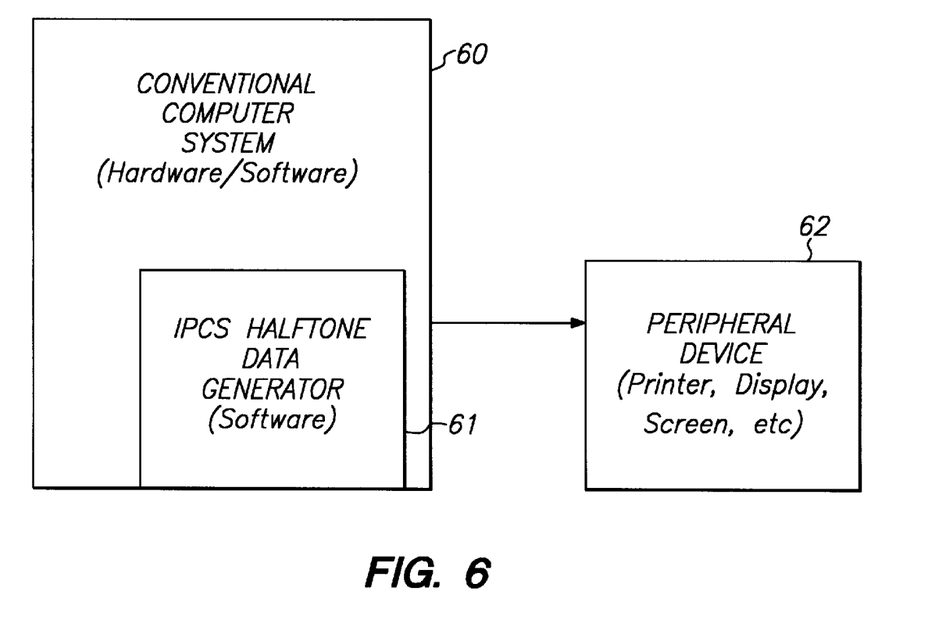
FIG. 6 illustrates one embodiment of apparatus in accordance with the present invention.

Referring now to FIG. 6, one embodiment of the present invention is implemented using a conventional personal computer system 60 including a computer software-implemented IPCS halftone generator 61 written in the "C" programming language to determine halftone cell values according to the invention and to generate halftone cell description data in accordance with the present invention. The halftone cell descriptions created by the halftone generator 61 are loaded in a conventional manner to memory (not shown) and thereafter become the default halftone screening descriptions for the peripheral device 62. The preferred embodiment specifies such description data as a table to operate under the "POSTSCRIPT" computer graphics standard. In accordance with the preferred embodiment, image data is processed in a conventional manner via a POSTSCRIPT interpreter program, in the computer or attached peripheral device, loaded with the data table produced by the halftone generator 61. Alternatively, the halftone generator could be incorporated directly into a POSTSCRIPT interpreter program. Either way, conventional means such as look-up tables or computer language statements may be used to implement the IPCS halftone generator of the present invention.

Figure 7:
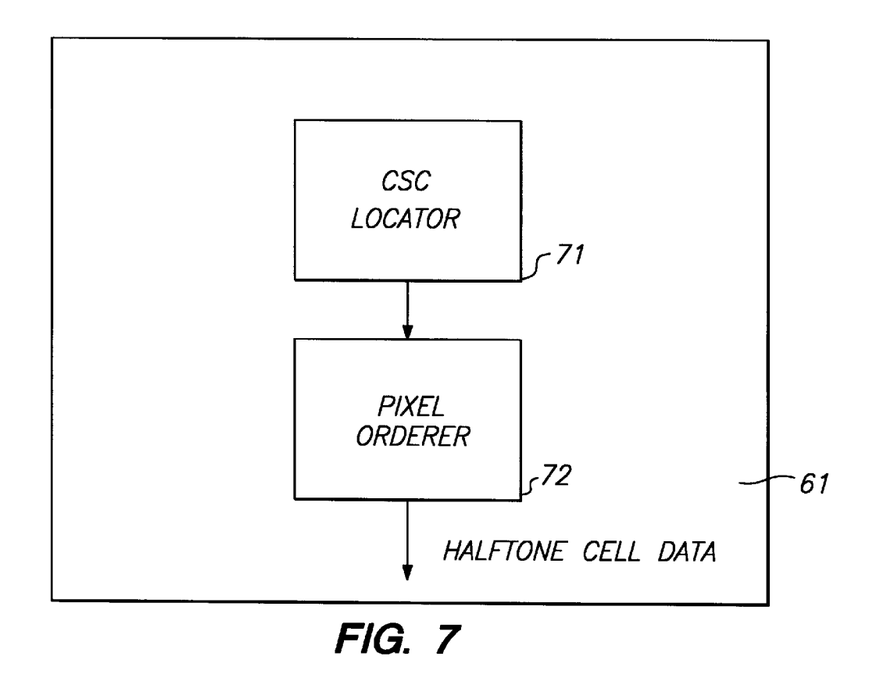
FIG. 7 illustrates in greater detail the IPCS halftone data generator illustrated in FIG. 6.

Referring now to FIG. 7 there is illustrated in greater detail the halftone generator 61 of FIG. 6. CSCs are located relative to the domain of the halftone cell in CSC locator 71. Pixel illumination orderer 72 then determines the order of illumination of pixels responsive to displacement along a curving structure from particular ones of the CSCs to particular ones of the pixels.

An exemplary "C" language program listing in accordance with the present invention to produce an 80×80 pixel halftone cell is reproduced below:

```
#include <stdlib.h>
#include <math.h>
#include <stdio.h>
#define CELL_WIDTH 80
#define CELL_HEIGHT 80
#define REGION_SIZE 10
#define REGION_STEPS_WIDTH (CELL_WIDTH / REGION_SIZE)
#define REGION_STEPS_HEIGHT (CELL_HEIGHT / REGION_SIZE)
    )
    fprintf(ofid,"\n ");
  )
  fprintf(ofid,"\n >\n");
  fprintf)ofid," >>\ndef\n");
  fprintf(ofid,0 1 255 {\n");
  fprintf(ofid," dup 255 div setgray 2 mul 20 add 400 2 350 rectfill\n");
  fprintf(ofid,"} for\n");
  fprintf(ofid,"0.5 setgray 20 50 512 350 rectfill\n");
  fprintf(ofid,"showpage\n\n");
  fclose(ofid);
}
main ()
{
  generate_ipcs_vignette();
  return(0);
}
```

A pertinent portion of the "POSTSCRIPT" language halftone cell description and display commands that are generated by the execution of the above "C" program are, for convenience, also reproduced below:

```
%|
%% IPCS_SCREEN
/ipcs_screen
<<
/HalftoneType 3
/Width 80
/Height 80
/Thresholds <
6400 threshold data values
>
>>
def
ipcs_screen sethalftone
0 1 255
   dup 255 div setgray 2 mul 20 add 400 2 350 rectfill
) for
0.5 setgray 20 50 512 350 rectfill
   showpage
```

Thus, a halftone cell incorporates irregularly placed curving structures to obtain improved visual and printing characteristics associated with a purely random screen without the uncontrolled noise inherent in such a system.

I claim:

1. A system for displaying images defined by illuminating pixels in an arrangement of halftone cells on a display device, comprising:

a processor operatively coupled to the display device, the processor determining an order of illumination of pixels in one of the halftone cells, the order of illumination being defined by a curving structure having a curving structure center (CSC) and extending in a spiral manner therefrom; and a locator operatively coupled to the processor, the locator randomly determining a location of said CSC.

2. A system as in claim 1, wherein the curving structure has multiple arms extending from the CSC in a spiral manner.

3. A system as in claim 1, wherein the display device produces a plurality of colors, and wherein different curving structures are used in producing different colors.

4. A method of displaying images defined by illuminating pixels in an arrangement of halftone cells, comprising:

defining a curving structure having a curving structure center (CSC) and extending in a spiral manner therefrom;

determining, for each of the halftone cells, a plurality of CSCs and corresponding CSC locations, at least one of said CSC locations being determined randomly;

determining for each pixel within each halftone cell, a corresponding closest CSC;

determining an order of illumination of pixels corresponding to each CSC; and determining how many pixels and which pixels are illuminated at any one time for a particular image intensity responsive to said order of illumination.

5. A method as in claim 4, wherein said curving structure has multiple arms extending from the CSC in a spiral manner.

6. A method as in claim 4, wherein the images are color images and wherein different curving structures are used in producing different colors.

7. A system for displaying images defined by illuminating pixels in an arrangement of halftone cells on a display device, comprising:

a processor operatively coupled to the display device, the processor determining an order of illumination of pixels in one of the halftone cells, the order of illumination being defined by a curving structure having a curving structure center (CSC) and having multiple arms extending in a spiral manner therefrom; and a locator operatively coupled to the processor, the locator determining a location of said CSC.

8. A system as in claim 7, wherein the locator randomly determines the location of said CSC.

9. A system as in claim 7, the processor being configured to determine correspondence between each of said pixels and a closest CSC.

10. A method of displaying images defined by illuminating pixels in an arrangement of halftone cells, comprising:

defining a curving structure having a curving structure center (CSC) and having multiple arms extending in a spiral manner therefrom;

determining, for each of the halftone cells, a plurality of CSCs and corresponding CSC locations;

determining, for each pixel within each halftone cell, a corresponding closest CSC;

determining an order of illumination of pixels corresponding to each CSC; and determining how many pixels and which pixels are illuminated at any one time for a particular image intensity responsive to said order of illumination.

11. A method as recited in claim 10, wherein at least one of said CSC locations is determined randomly.

12. A system as in claim 1, the processor further configured to determine correspondences between particular pixels and particular closest CSCs.

* * * * *

UNITED STATES PATENT AND TRADEMARK OFFICE
CERTIFICATE OF CORRECTION

PATENT NO. : 5,808,622
DATED : September 15, 1998
INVENTOR(S) : Daniel Hall

It is certified that error appears in the above-identified patent and that said Letters Patent is hereby corrected as shown below:

Col. 5, line 43: after "CY[n]" and before "*" insert --)--.

Col. 8, after line 9 and before line 10: insert -- double pi = 3.1415926535;

void generate_ipcs_vignette()
{
double OX[REGION_STEPS_WIDTH][REGION_STEPS_HEIGHT];
double OY[REGION_STEPS_WIDTH][REGION_STEPS_HEIGHT];
double CX[9 * REGION_STEPS_WIDTH * REGION_STEPS_HEIGHT];
double CY[9 * REGION_STEPS_WIDTH * REGION_STEPS_HEIGHT];
double A[CELL_WIDTH][CELL_HEIGHT];
int n,k,i,j;
double D,TD,DX,DY;
unsigned int THRESH[CELL_WIDTH][CELL_HEIGHT];

UNITED STATES PATENT AND TRADEMARK OFFICE
CERTIFICATE OF CORRECTION

PATENT NO. : 5,808,622
DATED : September 15, 1998
INVENTOR(S) : Daniel Hall

It is certified that error appears in the above-identified patent and that said Letters Patent is hereby corrected as shown below:

```
int min_i,min_j;
double min_val;
FILE *ofid;

srand(123456);
for (j=0; j < CELL_HEIGHT; j++){
    for (i=0; i < CELL_WIDTH; i++) (
    A[i][j] = 0;
    }
}
for (j=0; j < REGION_STEPS_WIDTH; j++) (
    for (i=0; i < REGION_STEPS_HEIGHT; i++) (
        OX[i][j] = (i * REGION_SIZE) + (REGION_SIZE * rand() /
                    (double)RAND_MAX);
        OY[i][j] = (j * REGION_SIZE) + (REGION_SIZE * rand() /
                    (double)RAND_MAX);
    )
)
n = 0;
for (k=0; k < 9; k++) (
    for (j=0; j < REGION_STEPS_WIDTH; j++) (
        for (i=0; i < REGION_STEPS_HEIGHT; i++) (
            CX[n] = OX[i][j] - CELL_WIDTH
```

UNITED STATES PATENT AND TRADEMARK OFFICE
CERTIFICATE OF CORRECTION

PATENT NO. : 5,808,622
DATED : September 15, 1998
INVENTOR(S) : Daniel Hall

It is certified that error appears in the above-identified patent and that said Letters Patent is hereby corrected as shown below:

```
                    + CELL_WIDTH * (k - 3 * (k/3));
            CY[n] = OY[i][j] - CELL_HEIGHT
                    + CELL_HEIGHT * (k/3);
        n + = 1;
        )
      )
    )
    for (j=0; j < CELL_HEIGHT; j++) (
        for (i=0; i < CELL_WIDTH; i++) (
            D = 100;
            for (n=0; n < 9*REGION_STEPS_WIDTH*REGION_STEPS_HEIGHT;
                n++) (
                TD = sqrt ((i-CX[n]) * (i-CX[n]) +
                    (j-CY[n] * (j-CY[n]) );
                if (TD < D) (
                    D = TD;
                    DX = i - CX[n];
                    DY = j - CY[n];
                )
            )
            A[i][j] = sin((pi*D/1.75) + 3*atan2(DX,DY));
        )
    )
```

UNITED STATES PATENT AND TRADEMARK OFFICE
CERTIFICATE OF CORRECTION

PATENT NO. : 5,808,622
DATED : September 15, 1998
INVENTOR(S) : Daniel Hall

It is certified that error appears in the above-identified patent and that said Letters Patent is hereby corrected as shown below:

```
for (n=0; n < CELL_HEIGHT * CELL_WIDTH; n++) (
        min_val = 10000;
        for (j=0; j < CELL_HEIGHT; j++) (
                for (i=0; i < CELL_WIDTH; i ++) (
                        if (A[i][j] < min_val) (
                                min_i = i;
                                min_j = j;
                                min_val = A[i][j];
                        )
                )
        )
        A[min_i][min_j] = 10000;
        THRESH[min_i][min_j] = n / ((CELL_HEIGHT * CELL_WIDTH) / 256);
)

ofid = fopen("IPCS_VIG.PS","w+t");
fprintf(ofid,"%%|\n%%%% IPCS_SCREEN\n");
fprintf(ofid,"/ipcs_screen\n");
fprintf(ofid,"    <<\n   /HalftoneType 1\n");
fprintf(ofid,"   /width %d\n   /Height %d\n",CELL_WIDTH,CELL_HEIGHT);
fprintf(ofid,"   /Thresholds <\n   ");
for (j=0; j < CELL_HEIGHT; j++) (
```

UNITED STATES PATENT AND TRADEMARK OFFICE
CERTIFICATE OF CORRECTION

PATENT NO. : 5,808,622
DATED : September 15, 1998
INVENTOR(S) : Daniel Hall

It is certified that error appears in the above-identified patent and that said Letters Patent is hereby corrected as shown below:

```
for (i=0; i < CELL_WIDTH; i++) (
    fprintf(ofid,"%02x ",THRESH[i][j]);--
```

Col. 8, line 14: after "ofid," and before "0 1 255" insert --"--.

Col. 8, line 42: after "0 1 255" insert --(--.

Signed and Sealed this

Fifteenth Day of February, 2000

Attest:

Attesting Officer

Q. TODD DICKINSON
Commissioner of Patents and Trademarks